US012608993B2

(12) United States Patent
Woo et al.

(10) Patent No.: US 12,608,993 B2
(45) Date of Patent: Apr. 21, 2026

(54) AUTOMATED TELLER MACHINE AND CONTROL METHOD THEREOF

(71) Applicant: HYOSUNG TNS INC., Seoul (KR)

(72) Inventors: Hyun Sik Woo, Seoul (KR); Seonhyang Lee, Seoul (KR); Dongkyung Kim, Seoul (KR)

(73) Assignee: HYOSUNG TNS INC., Seoul (KR)

( * ) Notice: Subject to any disclaimer, the term of this patent is extended or adjusted under 35 U.S.C. 154(b) by 208 days.

(21) Appl. No.: 18/538,221

(22) Filed: Dec. 13, 2023

(65) Prior Publication Data

US 2024/0221449 A1 Jul. 4, 2024

(30) Foreign Application Priority Data

Dec. 29, 2022 (KR) ........................ 10-2022-0189902

(51) Int. Cl.

*B65H 29/62* (2006.01)
*G07D 11/14* (2019.01)
*G07D 11/18* (2019.01)

(52) U.S. Cl.

CPC ............. *G07D 11/18* (2019.01); *G07D 11/14* (2019.01); *G07D 2207/00* (2013.01); *G07D 2211/00* (2013.01)

(58) Field of Classification Search

CPC ............ B65H 29/62; B65H 2701/1912; G07F 19/201; G07D 11/14; G07D 11/18;
(Continued)

(56) References Cited

U.S. PATENT DOCUMENTS 8,376,144 B2 * 2/2013 Yokokawa ............. B65H 5/006 271/3.14
9,396,619 B2 * 7/2016 Cho ......................... B65H 1/14
(Continued)

FOREIGN PATENT DOCUMENTS

JP 2011-154654 8/2011
KR 10-2015-0066119 A 6/2015
(Continued)

OTHER PUBLICATIONS

Notice of Allowance in KR Application No. 10-2022-0189902 dated Mar. 11, 2025 and English translation.
(Continued)

*Primary Examiner* — Leslie A Nicholson, III
(74) *Attorney, Agent, or Firm* — BACON & THOMAS, PLLC

(57) ABSTRACT

An automated teller machine includes: a bundle receiving unit in which a bundle of mediums are input; a discrimination unit that receives the mediums from the bundle receiving unit and discriminates the mediums; a temporary holding unit that temporarily holds the mediums discriminated in the discrimination unit; a conveyance path for conveying the mediums between the discrimination unit and the temporary holding unit; and a controller that controls the bundle receiving unit, the discrimination unit, and the temporary holding unit. When the mediums on the conveyance path are returned to the bundle receiving unit, the controller controls the bundle receiving unit such that the mediums on the conveyance path are stacked in a single bundle with the mediums stacked in the bundle receiving unit.

5 Claims, 20 Drawing Sheets

(58) Field of Classification Search
CPC ...... G07D 11/009; G07D 11/22; G07D 11/50; G07D 2211/00; G07D 2207/00
USPC ........................................................ 270/52.01
See application file for complete search history.

(56) References Cited

U.S. PATENT DOCUMENTS

| | | | | |
|---|---|---|---|---|
| 11,472,657 | B2 * | 10/2022 | Izawa | B65H 29/006 |
| 11,989,994 | B2 * | 5/2024 | Woo | B65H 3/047 |
| 12,243,368 | B2 * | 3/2025 | Yokoo | B65H 29/145 |
| 2006/0169770 | A1 * | 8/2006 | Koshizuka | G07D 11/10<br>235/379 |

FOREIGN PATENT DOCUMENTS

| | | |
|---|---|---|
| KR | 10-2021-0144988 | 12/2021 |
| KR | 10-2022-0050409 A | 4/2022 |

OTHER PUBLICATIONS

Office Action in Korean Application No. 10-2022-0189902 dated Dec. 7, 2024.

* cited by examiner

210

AUTOMATED TELLER MACHINE AND CONTROL METHOD THEREOF

TECHNICAL FIELD

The present disclosure relates to an automated teller machine and a control method of the automated teller machine.

BACKGROUND

In general, automated teller machines can quickly and conveniently provide most financial services, excluding consultation services, unmanned without time constraints. A conventional automated teller machine includes a bundle module that receives a bundle of mediums input and conveys the bundle of mediums through a conveyance belt, a separation unit that separates the mediums input into the bundle module into individual sheets, a discrimination module that discriminates information and authenticity of the deposit mediums that are conveyed after passing through the separation unit, a print module for printing information required for deposited checks, a cassette unit for storing mediums discriminated as normal banknotes in the discrimination unit among deposited mediums, and a reject module in which mediums discriminated as reject banknotes in the discrimination unit among deposited mediums or deposit-canceled mediums are returned and stored and which conveys the returned mediums in the form of a bundle to the bundle module. The mediums input into the bundle module in the form of a bundle are conveyed one by one to the cassette unit through a conveyance path. When a failure occurs in the medium during the medium conveyance process, the medium initially deposited and accumulated in the bundle module is returned to the customer first. When the medium initially deposited and accumulated in the bundle module is returned to the customer, the medium that is being conveyed on the conveyance path is conveyed to the bundle module and accumulated, and then the mediums stacked in the bundle module is returned to the customer once again.

However, in the case of the conventional automated teller machine, the medium initially deposited and stacked in the bundle module and the medium being conveyed on the conveyance path are returned to the customer twice, so a situation where the customer receives only the first returned medium and goes home without taking the second returned medium frequently occur.

SUMMARY

In view of the above, the present disclosure provides an automated teller machine and a control method of the automated teller machine which when mediums being deposited are returned to a customer, can return the returned mediums to the customer at once in a bundle.

In accordance with an embodiment of the present disclosure, there is provided an automated teller machine including: a bundle receiving unit in which a bundle of mediums are input; a discrimination unit that receives the mediums from the bundle receiving unit and discriminates the mediums; a temporary holding unit that temporarily holds the mediums discriminated in the discrimination unit; a conveyance path for conveying the mediums between the discrimination unit and the temporary holding unit; and a controller that controls the bundle receiving unit, the discrimination unit, and the temporary holding unit, wherein when the mediums on the conveyance path are returned to the bundle receiving unit, the controller controls the bundle receiving unit such that the mediums on the conveyance path are stacked in a single bundle with the mediums stacked in the bundle receiving unit.

According to embodiments of the present disclosure, when the mediums being deposited are returned through the bundle receiving unit, the mediums initially deposited and stacked in the bundle receiving unit and the mediums being conveyed on the conveyance path to the customer are returned from the bundle receiving unit at once, thereby ensuring that the customer takes all mediums returned from the bundle receiving unit.

In addition, according to embodiments of the present disclosure, when the mediums being deposited are returned through the bundle receiving unit, the mediums being conveyed on the conveyance path are overlapped and stacked on the mediums already stacked in the bundle receiving unit, so that the returned mediums can be stacked and provided to the customer in a single bundle.

DETAILED DESCRIPTION

Hereinafter, specific embodiments for implementing the technical idea of the present disclosure will be described in detail with reference to the drawings.

Figure 1:
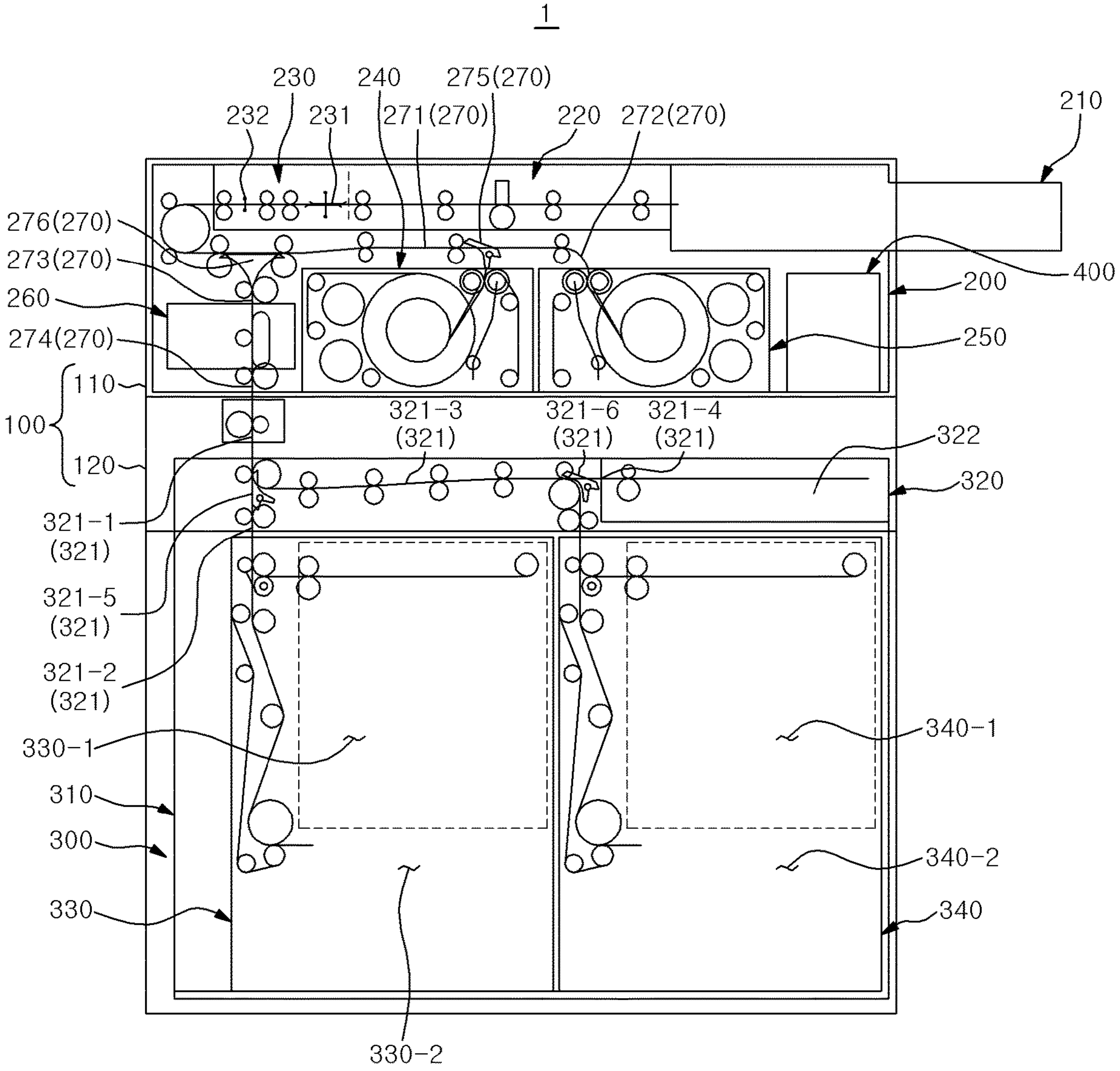
FIG. 1 is a diagram showing an automated teller machine according to one embodiment of the present disclosure.
Figure 2:
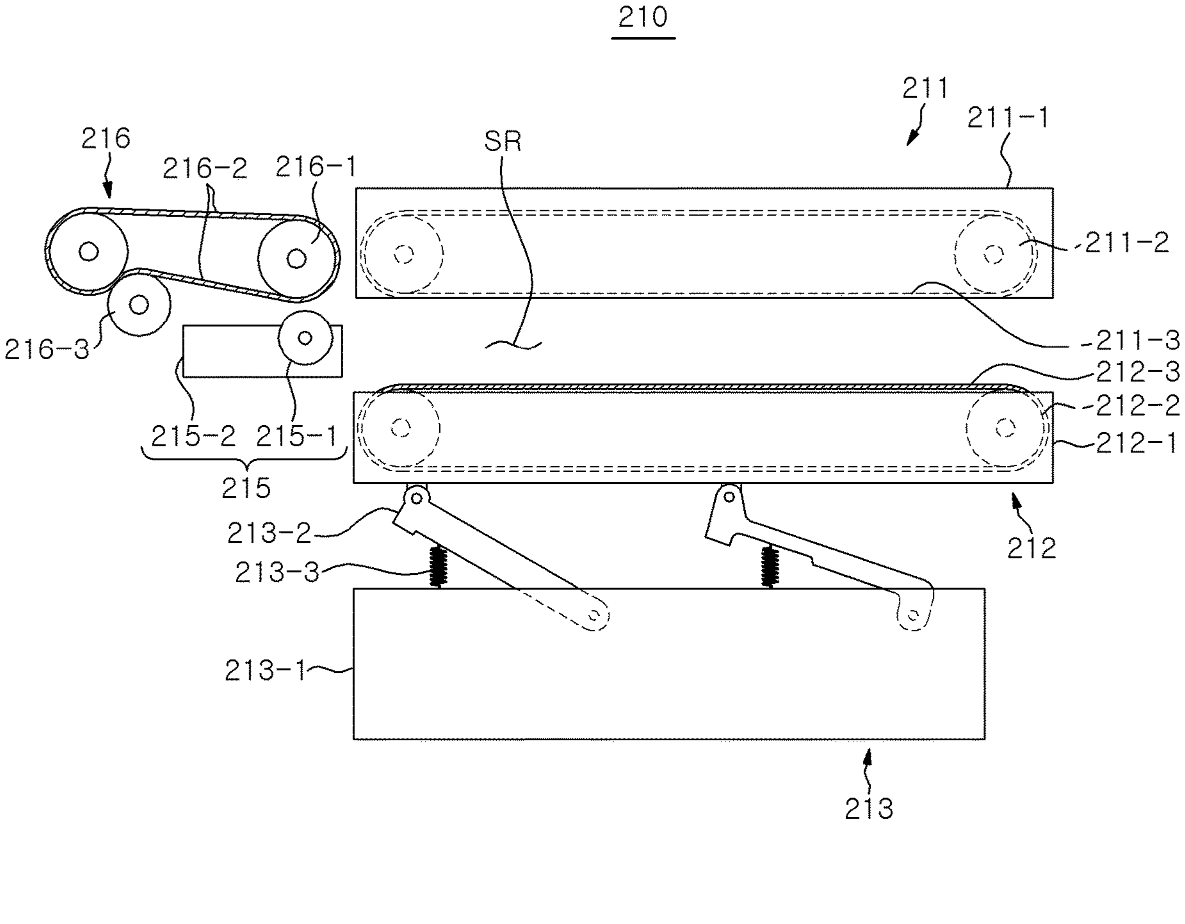
FIG. 2 is a diagram showing a bundle receiving unit of the automated teller machine according to one embodiment of the present disclosure.

Referring to FIGS. 1 and 2, an automated teller machine 1 according to one embodiment of the present disclosure can discriminate and sort deposited mediums, and then store them or return them to a customer. The automated teller machine 1 can separate deposited mediums in a bundle into individual sheets, discriminate them, and sort the discriminated mediums to store them or return them to the customer. The medium may be a banknote or a check, and the bundle of mediums may include one or more of a banknote and a check. The automated teller machine 1 may include a main body 100, an upper module 200, and a lower module 300.

The main body 100 may accommodate at least a portion of the upper module 200 therein and may detachably accommodate the lower module 300 therein. The main body 100 may include an upper body 110 and a lower body 120. The upper body 110 may have a space in which at least a portion of the upper module 200 can be accommodated therein. The upper body 110 may be supported by the lower body 120. The lower body 120 may support the upper body 110, and may have a space in which the lower module 300 can be detachably accommodated.

When a bundle of mediums are deposited, the upper module 200 separates the deposited bundle of mediums into individual sheets, identifies them, and sorts and temporarily holds the mediums based on the discriminated results. In addition, the upper module 200 may return some of the temporarily held mediums to the customer or convey them to the lower module 300 to be stored in the lower module 300. The upper module 200 may include a bundle receiving unit 210, a medium alignment unit 220, a discrimination unit 230, temporary holding units 240 and 250, a check printing unit 260, and an upper conveyance path 270.

A bundle of mediums may be input in the bundle receiving unit 210. In addition, the bundle receiving unit 210 may separate the bundle of mediums input therein into individual sheets and convey them. The bundle of mediums may include at least one bill and check. The bundle receiving unit 210 may include a first bundle transport unit 211, a second bundle transport unit 212, an elevating unit 213, a semi-separation unit 215, and a sheet separation unit 216.

When a bundle of mediums are input in the bundle receiving unit 210, the first bundle transport unit 211 may transport the mediums to the semi-separation unit 215 together with the second bundle transport unit 212. In addition, the first bundle transport unit 211 transports the mediums from the semi-separation unit 215 to the second bundle transport unit 212 when the mediums are conveyed from the temporary holding units 240 and 250 to the bundle receiving unit 210. The first bundle transport unit 211 may include a first bundle transport frame 211-1, first bundle transport rollers 211-2, and a first bundle transport belt 211-3.

The first bundle transport frame 211-1, together with a second bundle transport frame 212-1 included in the second bundle transport unit 212, has a space in which a bundle of mediums can be input and mediums can be stacked. The first bundle transport frame 211-1 may be disposed horizontally and may rotatably support the first bundle transport rollers 211-2. The first bundle transport rollers 211-2 may be disposed at least both end portions of the first bundle transport frame 211-1 to be spaced apart from each other and rotatable in a forward or reverse direction, respectively. The first bundle transport belt 211-3 may be wound on the first bundle transport rollers 211-2 in an endless orbit. With such configurations, as the first bundle transport rollers 211-2 rotate in one direction, the first bundle transport belt 211-3 moves in the endless orbit, and the lower side of the first bundle transport belt 211-3 moving in the endless orbit may be moved in a direction in which the medium is deposited or in a direction opposite to the deposit direction.

When a bundle of the mediums are input in the bundle receiving unit 210, the second bundle transport unit 212 may transport the mediums to the semi-separation unit 215 together with the first bundle transport unit 211. In addition, when the mediums are conveyed from the temporary holding units 240 and 250 to the bundle receiving unit 210, the mediums may be conveyed to and stacked on the second bundle transport unit 212. The second bundle transport unit 212 may be disposed below the first bundle transport unit 211 and spaced apart from the first bundle transport unit 211, and may form a stacking space SR in which mediums can be input and stacked together with the first bundle transport frame 211 of the first bundle transport unit 211-1. The second bundle transport unit 212 may include a second bundle transport frame 212-1, second bundle transport rollers 212-2, and a second bundle transport belt 212-3.

The second bundle transport frame 212-1 may be disposed horizontally below the first bundle transport frame 211-1 and spaced apart from the first bundle transport frame 211-1, and may rotatably support the second bundle transport rollers 212-2. The second bundle transport rollers 212-2 may be disposed at least both end portions of the second bundle transport frame 212-1 to be spaced apart from each other and to be rotatable in the forward or reverse direction, respectively. The second bundle transport belt 212-3 may be wound on the second bundle transport rollers 212-2 in an endless orbit. With such configurations, as the second bundle transport rollers 212-2 rotate in one direction, the second bundle transport belt 212-3 moves in the endless orbit, and the lower side of the first bundle transport belt 212-3 moving in the endless orbit may be moved in the direction in which the medium is deposited or in the direction opposite to the depositing direction.

The elevating unit 213 may move the second bundle transport unit 212 up and down. The distance between the first bundle transport unit 211 and the second bundle transport unit 212 can be adjusted by moving the second bundle transport unit 212 up and down by the elevating unit 213. The elevating unit 213 may include an elevating base 213-1, an elevating drive part 213-2, and an elastic member 213-3.

The elevating base 213-1 may be disposed below the second bundle transport frame 212-1 of the second bundle transport unit 212 and spaced apart from the second bundle transport frame 212-1. The elevating drive part 213-2 may be supported by the elevating base 213-1 and may move the second bundle transport frame 212-1 up and down. The elevating drive part 213-2 may be implemented as a link combined with the second bundle transport frame 212-1 and the elevating base 213-1 to have a four-bar link structure. However, the elevating drive part 213-2 may be configured as an operating cylinder that is expandable and contractible by a working fluid such as air or oil as long as it can be expanded and contracted to move the second bundle transport frame 212-2 up and down.

The elastic member 213-3 may be disposed between the second bundle transport frame 212-1 and the elevating base 213-1 to provide an upward elastic force to the second bundle transport frame 212-1. The elastic member 213-3 may push the second bundle transport unit 212 upward so that the uppermost medium of the bundle of mediums loaded between the first bundle transport unit 211 and the second bundle transport unit 212 continues to contact the first bundle transport belt 211-3 of the first bundle transport unit 211 even when the uppermost medium of the bundle of mediums loaded between the first bundle transport unit 211 and the second bundle transport unit 212 is moved toward the semi-separation unit 215 and the height of the bundle of mediums decreases.

When a bundle of mediums are deposited, the semi-separation unit 215 may ensure that only a preset number of mediums among the bundle of mediums are conveyed to the sheet separating unit 216. The semi-separation unit 215 may be disposed after the second bundle transport unit 212 in the medium depositing direction. The semi-separation unit 215 may include a semi-separating roller 215-1, and a bill press 215-2.

The semi-separating roller 215-1 may form a gap between the semi-separating roller 215-1 and a lower surface of the sheet separation unit 216 to allow only the preset number of mediums to pass through the gap. The semi-separating roller 215-1 may be disposed on one side of an upper end of the bill press 215-2, and the bill press 215-2 may be moved up and down by a bill press drive unit (not shown) and rotated to be inclined.

The sheet separation unit 216 may separate the preset number of mediums that have passed through the gap between the sheet separation unit 216 and the semi-separating roller 215-1 into individual sheets. The sheet separation unit 216 may be disposed after the semi-separation unit 215 in the medium depositing direction. The sheet separation unit 216 may include a sheet separation roller 216-1, a sheet separation belt 216-2, and a tension roller 216-3.

A pair of sheet separation rollers 216-1 may be arranged to be rotatable so as to be spaced apart from each other horizontally. The sheet separation belt 216-2 may be wound on the sheet separation rollers 216-1 in an endless orbit and may be moved according to a rotation direction of the sheet separation rollers 216-1. The tension roller 216-3 may be disposed between the sheet separation rollers 216-1 and may apply a predetermined tension to a lower side of the sheet separation belt 216-2 moving in the endless orbit. With such configurations, a portion of the lower side of the sheet separation belt 216-2 moving in the endless orbit may have a curved shape rather than a straight shape. The tension roller 216-3 may press the lower side of the sheet separation belt 216-2 moving in the endless orbit with a predetermined force so that only one medium can pass between the tension roller 216-3 and the sheet separation belt 216-1.

The medium alignment unit 220 may align and convey the medium conveyed individually from the bundle receiving unit 210. The medium alignment unit 220 may align and convey the medium that is conveyed as a single sheet from the bundle receiving unit 210 in an unaligned state. For example, the medium alignment unit 220 may be disposed at an angle to the conveyance direction to align and convey the conveyed medium to be disposed parallel to the conveyance direction.

The discrimination unit 230 may discriminate the medium aligned and conveyed individually from the medium alignment unit 220. The discrimination unit 230 may determine whether the medium is a normal banknote or a reject banknote. In addition, the discrimination unit 230 may discriminate the type of medium. The discrimination unit 230 may include a bill discriminator 231 for discriminating bills and a check discriminator 232 for discriminating checks. For example, the bill separator 231 may be a contact image sensor (CIS), and the check separator 232 may be a magnetic resistance (MR).

The temporary holding units 240 and 250 may temporarily hold the mediums discriminated in the discrimination unit 230. The temporary holding units 240 and 250 may include a normal banknote temporary holding unit 240 and a reject banknote temporary holding unit 250. The normal banknote temporary holding unit 240 may temporarily and individually hold the normal banknotes, which are discriminated in the discrimination unit 230 and conveyed as individual sheets. In the normal banknote temporary holding unit 240, normal bills or checks may be temporarily and individually held. The reject banknote temporary holding unit 250 may temporarily and individually hold the reject banknotes, which are discriminated in the discrimination unit 230 and conveyed as individual sheets. In the reject banknote temporary holding unit 250, reject bills or checks may be temporarily and individually held.

The check printing unit 260 may print a seal on checks among the normal banknotes conveyed as individual sheets from the normal banknote temporary holding unit 240. The normal bills or checks, which temporarily held as individual sheets in the normal banknote temporary holding unit 240, are conveyed to the lower module 300 as individual sheets from the normal banknote temporary holding unit 240 to be stored in cassettes 330 and 340 to be described later included in the lower module 300.

The upper conveyance path 270 may allow the medium to be conveyed as a single sheet between the discrimination unit 230 and the normal banknote temporary holding unit 240 or between the discrimination unit 230 and the reject banknote temporary holding unit 250. In addition, the upper conveyance path 270 may allow the medium to be conveyed as a single sheet from the normal banknote temporary holding unit 240 to the lower module 300 or from the reject banknote temporary holding unit 250 to the lower module 300. The upper conveyance path 270 includes a first upper conveyance path 271, a second upper conveyance path 272, a third upper conveyance path 273, a fourth upper conveyance path 274, a first upper switching gate 275, and a second upper switching gate 276.

The first upper conveyance path 271 may allow the medium to be conveyed as a single sheet between the discrimination unit 230 and the normal banknote temporary holding unit 240. In addition, the first upper conveyance path 271 may allow the medium to be conveyed as a single sheet between the discrimination unit 230 and the reject banknote temporary holding unit 250. Further, the first upper conveyance path 271 may allow the medium to be conveyed as a single sheet from the normal banknote temporary holding unit 240 to the lower module 300. In addition, the first upper conveyance path 271 may allow the medium to be conveyed as a single sheet from the reject banknote temporary holding unit 250 to the lower module 300. The first upper conveyance path 271 may be connected to the discrimination unit 230 and the normal banknote temporary holding unit 240. Further, the first upper conveyance path 271 may be connected to the second upper conveyance path 272 through the first upper switching gate 275. In addition, the first upper conveyance path 271 may be connected to the third upper conveyance path 273 through the second upper switching gate 276. The second upper conveyance path 272 may allow the medium to be conveyed as a single sheet between the first upper conveyance path 271 and the reject banknote temporary holding unit 250. The second upper conveyance path 272 may be connected to the first upper conveyance path 271 and the reject banknote temporary holding unit 250. The second upper conveyance path 272 may be connected to the first upper conveyance path 271 through the first upper switching gate 275. The third upper conveyance path 273 may allow the medium to be conveyed as a single sheet from the first upper conveyance path 271 to the check printing unit 260. The third upper conveyance path 272 may be connected to the first upper conveyance path 271 through the second upper switching gate 276. The fourth upper conveyance path 274 may allow the medium to be conveyed as a single sheet from the check printing unit 260 to the lower module 300. The fourth upper conveyance path 274 may be connected to the check printing unit 260 and the lower module 300. The fourth upper conveyance path 274 may be connected to a lower conveyance path 321 to be described later included in the lower module 300. The first upper switching gate 275 may connect the first upper conveyance path 271 to the normal temporary holding unit 240 or connect the first upper conveyance path 271 to the second upper conveyance path 272. The second upper switching gate 276 may or may not connect the first upper conveyance path 271 to the check printing unit 260.

At least some of the mediums sorted in the upper module 200 may be conveyed to and stored in the lower module 300. In the lower module 300, the normal banknotes temporarily held in the normal banknote temporary holding unit 240 of the upper module 200 may be conveyed individually from the normal banknote temporary holding unit 240 and stored therein. The lower module 300 may be detachably accommodated inside the lower body 120 of the main body 100. The lower module 300 may be accommodated inside the lower body 120 of the main body 100 and connected to the upper module 200 at least partially accommodated inside the upper body 110 of the main body 100. The lower module 300 may include a cassette accommodation frame 310, a lower conveyance module 320, and cassettes 330 and 340.

The cassette accommodation frame 310 can accommodate the cassettes 330 and 340 in a detachable manner. The cassette accommodation frame 310 may be detachably accommodated inside the lower body 120 of the main body 100 with the cassettes 330 and 340 accommodated therein. The cassette accommodation frame 310 may be accommodated inside the lower body 120 of the main body 100 through one open surface of the lower body 120. The cassette accommodation frame 310 has an open surface, and the cassettes 330 and 340 may be detachably accommodated inside the cassette accommodating frame 310 through the open surface of the cassette accommodating frame 310. The open surface of the cassette accommodation frame 310 may be opened and closed by the lower conveyance module 320. In a state where the open surface of the cassette accommodation frame 310 is opened by the lower conveyance module 320, the cassettes 330 and 340 can be detachably accommodated inside the cassette accommodation frame 310.

The lower conveyance module 320 can open and close the open surface of the cassette accommodation frame 310. The lower conveyance module 320 may include at least a portion of the lower conveyance path 321 connected to the upper conveyance path 270 of the upper module 200, and an additional storage box 322. The lower conveyance path 321 may allow mediums conveyed from the upper module 200 individually to the cassettes 330 and 340 or the additional storage box 322. The lower conveyance path 321 may include a first lower conveyance path 321-1, a second lower conveyance path 321-2, a third lower conveyance path 321-3, and a fourth lower conveyance path 321-4, a first lower switching gate 321-5, and a second lower switching gate 321-6. The first lower conveyance path 321-1 may be connected to the upper conveyance path 270 of the upper module 200. The first lower conveyance path 321-1 may be connected to the fourth upper conveyance path 274 of the upper conveyance path 270. Accordingly, the mediums can be conveyed individually from the upper module 200 to the lower module 300 through the fourth upper conveyance path 274 and the first lower conveyance path 321-1. The second lower conveyance path 321-2 may allow the mediums conveyed individually from the upper module 200 through the first lower conveyance path 321-1 to be conveyed to a first cassette 330 to be described later included in the cassettes 330 and 340. The second lower conveyance path 321-2 may be connected to the first lower conveyance path 321-1 and the first cassette 330. The second lower conveyance path 321-2 may be connected to the first lower conveyance path 321-1 through the first lower switching gate 321-5. The third lower conveyance path 321-3 may allow the mediums conveyed individually through the first lower conveyance path 321-1 to be conveyed to a second cassette 340 to be described later included in the cassettes 330 and 340. In addition, the third lower conveyance path 321-3 may allow the mediums conveyed individually through the first lower conveyance path 321-1 to be conveyed to the additional storage box 322. The third lower conveyance path 321-3 may be connected to the first lower conveyance path 321-1 and the second cassette 340. The third lower conveyance path 321-3 may be connected to the first lower conveyance path 321-1 through the first lower switching gate 321-5. The fourth lower conveyance path 321-4 may allow the mediums conveyed individually through the first lower conveyance path 321-1 and the third lower conveyance path 321-3 to be conveyed to the additional storage box 322. The fourth lower conveyance path 321-4 may be connected to the third lower conveyance path 321-3 through the second lower switching gate 321-6. The first lower switching gate 321-5 may connect the first lower conveyance path 321-1 to the second lower conveyance path 321-2 or the third lower conveyance path 321-3. The second lower switching gate 321-6 may connect the third lower conveyance path 321-3 to the second cassette 340 or the fourth lower conveyance path 321-4. The second lower conveyance path 321-2, the third lower conveyance path 321-3, the fourth lower conveyance path 321-4, the first lower switching gate 321-5, and the second lower switching gate 321-6 may be included in the lower conveyance module 320. In addition, the first lower conveyance path 321-1 may be disposed in the lower body 120 of the main body 100 to be connected to the fourth upper conveyance path 274 and the second lower conveyance path 321-2 of the upper conveyance path 270. The additional storage box 322 may store counterfeit banknotes among the reject banknotes sorted in the upper module 200. Further, the additional storage box 322 may store uncollected banknotes that have not been collected by the customer although they have been conveyed to and stacked in the bundle receiving unit 210 to be returned to the customer.

At least some of the mediums sorted in the upper module 200 may be stored in the cassettes 330 and 340. The normal banknotes sorted in the upper module 200 may be stored in the cassettes 330 and 340. One or more of normal banknotes and checks may be stored in the cassettes 330 and 340. The cassettes 330 and 340 may include a plurality of storage spaces 330-1, 330-2, 340-1, and 340-2. Accordingly, in one of the plurality of storage spaces 330-1, 330-2, 340-1, and 340-2 of the cassettes 330 and 340, bills as normal banknotes may be stored, and checks as normal banknotes may be stored in the others, or bills as normal banknotes may be stored by type in each of the plurality of storage spaces 330-1, 330-2, 340-1, and 340-2 of the cassettes 330 and 340, or checks as normal banknotes may be stored by type in each of the plurality of storage spaces 330-1, 330-2, 340-1, and 340-2 of the cassettes 330 and 340. The plurality of storage spaces 330-1, 330-2, 340-1, and 340-2 may be configured to be arranged in the up-down direction and to be partitioned from each other.

The cassettes 330 and 340 may be detachably accommodated inside the cassette accommodating frame 310 through the open surface of the cassette accommodating frame 310. The cassettes 330 and 340 may each have an open surface, and a cassette opening/closing door (not shown) can open and close the open surface of the cassettes 330 and 340. In a state in which the cassette opening/closing door opens the open surface of the cassettes 330 and 340, the normal banknotes stored in the cassette 330 and 340 can be taken out by the customer. In addition, in a state in which the cassette opening/closing door closes the open surface of the cassettes 330 and 340, the cassettes 330 and 340 can be detachably accommodated inside the cassette accommodation frame 310 through the open surface of the cassette accommodation frame 310. The cassettes 330 and 340 may include a first cassette 330 and a second cassette 340. The second lower conveyance path 321-2 may be connected to the first cassette 330, so that mediums conveyed individually through the second lower conveyance path 321-2, that is, normal banknotes, may be stored in the first cassette 330. The first cassette 330 may include a first cassette upper storage space 330-1 and a first cassette lower storage space 330-2. The third lower conveyance path 321-3 may be connected to the second cassette 340, so that mediums conveyed individually through the third lower conveyance path 321-3, that is, normal banknotes, may be stored in the second cassette 340. The second cassette 340 may include a second cassette upper storage space 340-1 and a first cassette lower storage space 340-2.

A controller 400 may be connected to each of the bundle receiving unit 210, the medium alignment unit 220, the discrimination unit 230, the temporary holding units 240 and 250, the check printing unit 260, and the upper conveyance path 270 of the upper module 200 to control each of them. For example, when a customer deposits a bundle of mediums into the bundle receiving unit 210 of the upper module 200, the controller 400 may control the bundle receiving unit 210 so that the deposited bundle of mediums are separated into individual sheets and conveyed to the medium alignment unit 220. In addition, the controller 400 may control the medium alignment unit 220 so that the mediums are sorted and conveyed to the discrimination unit 230. Further, the controller 400 may control the upper conveyance path 270 and the normal banknote temporary holding unit 240 or the reject banknote temporary holding unit 250 so that the mediums discriminated in the discrimination unit 230 are conveyed to the normal banknote temporary holding unit 240 or the reject banknote temporary holding unit 250.

In addition, when a customer selects deposit, the controller 400 may control the normal banknote temporary holding unit 240, the upper conveyance path 270, the lower conveyance path 321 of the lower module 300, and the cassettes 330 and 340 such that the normal banknote temporarily held in the normal banknote temporary holding unit 240. When the customer selects cancellation of the deposit, the controller 400 may control the normal banknote temporary holding unit 240, the reject banknote temporary holding unit 250, the discrimination unit 230, the medium alignment unit 220, and the upper conveyance path 270 such that at least some of the normal banknotes temporarily held in the normal banknote temporary holding unit 240 and the reject banknote temporarily held in the reject banknote temporary holding unit 250 are conveyed to and stacked in the bundle receiving unit 210. After the deposit, the controller 400 may control the reject banknote temporary holding unit 250, the discrimination unit 230, the medium alignment unit 220, and the upper conveyance path 270 such that at least some of the reject banknotes temporarily held in the reject banknote temporary holding unit 250 are conveyed to and stacked in the bundle receiving unit 210.

Further, when a failure occurs in the medium or the like during the process of conveying the medium being deposited, the controller 400 controls the bundle receiving unit 210 such that the medium on the conveyance path is stacked on the mediums stacked in the bundle receiving unit 210 in a single bundle. In other words, when a failure occurs in the medium or the like during the process of conveying the medium being deposited, the controller 400 may move the mediums stacked in the stacking space SR in the direction opposite to the deposit direction such that the uppermost medium among the mediums stacked in the stacking space SR is laid on the bill press 215-2 of the bundle receiving unit 210. When the medium is laid on the bill press 215-2 of the bundle receiving unit 210, the controller 400 may dispose the bill press 215-2 to be inclined upward toward the stacking space SR, and convey the medium on the conveyance path to overlap the medium laid on the bill press 215-2.

Figure 3:
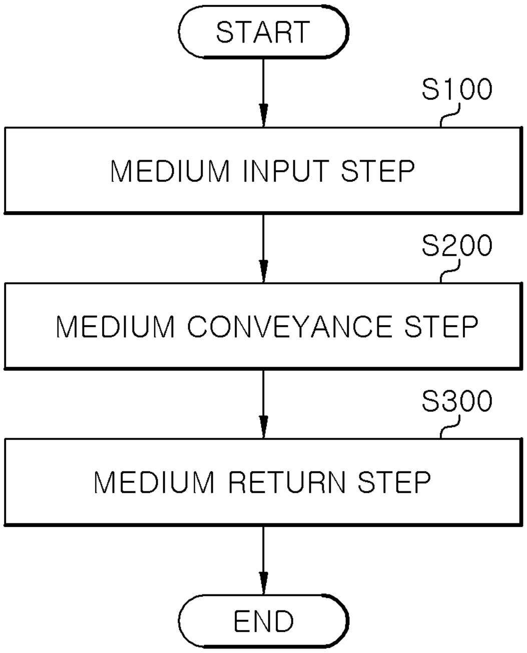
FIG. 3 is a diagram showing a control method of the automated teller machine according to one embodiment of the present disclosure.

Referring to FIG. 3, a control method of the automated teller machine according to one embodiment of the present disclosure may include a medium input step S100, a medium conveyance step S200, and a medium return step S300.

In the medium input step S100, a bundle of mediums M may be input in the stacking space SR of the bundle receiving unit 210. The mediums M input in the stacking space SR may be conveyed in the depositing direction in which the mediums M are deposited by the first bundle transport unit 211 and the second bundle transport unit 212.

Figure 4:
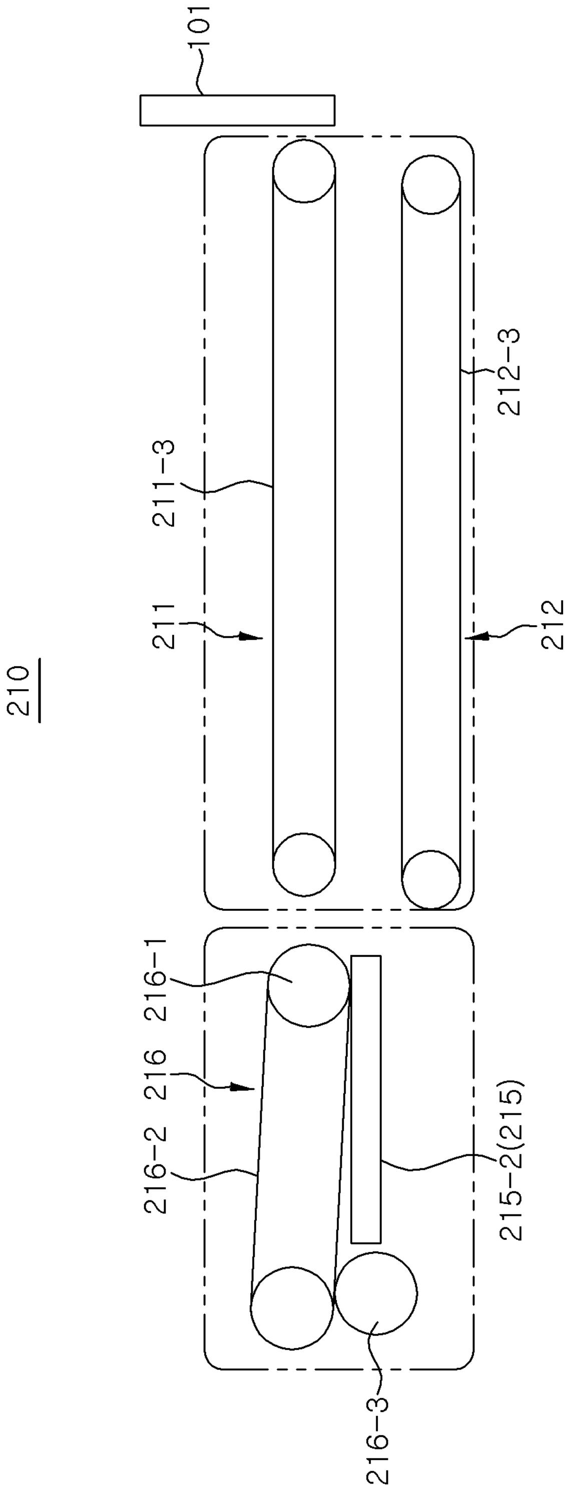
FIG. 4 is a diagram showing the operating state of the automated teller machine when a medium is prepared to be input in the bundle receiving unit, according to one embodiment of the present disclosure.

For example, referring to FIG. 4, in the medium input step S100, a shutter 101 of the bundle receiving unit 210 may be opened. When the shutter 101 is opened, the mediums M can be input in the stacking space SR of the bundle receiving unit 210. The mediums M input in the stacking space SR may be conveyed in the depositing direction in which the mediums M are deposited by the first bundle transport unit 211 and the second bundle transport unit 212.

In the medium conveyance step S200, the mediums M input in the stacking space SR of the bundle receiving unit 210 may be conveyed through the conveyance path. The mediums M input in the stacking space SR may be conveyed to the semi-separation unit 215 through the first bundle transport unit 211 and the second bundle transport unit 212 of the bundle receiving unit 210. In this case, the second bundle transport unit 212 may be moved upward and come into close contact with the mediums M. The mediums M conveyed to the semi-separation unit 215 by the first bundle transport unit 211 and the second bundle transport unit 212 may be conveyed to the conveyance path individually through the sheet separation unit 216.

Figure 5:
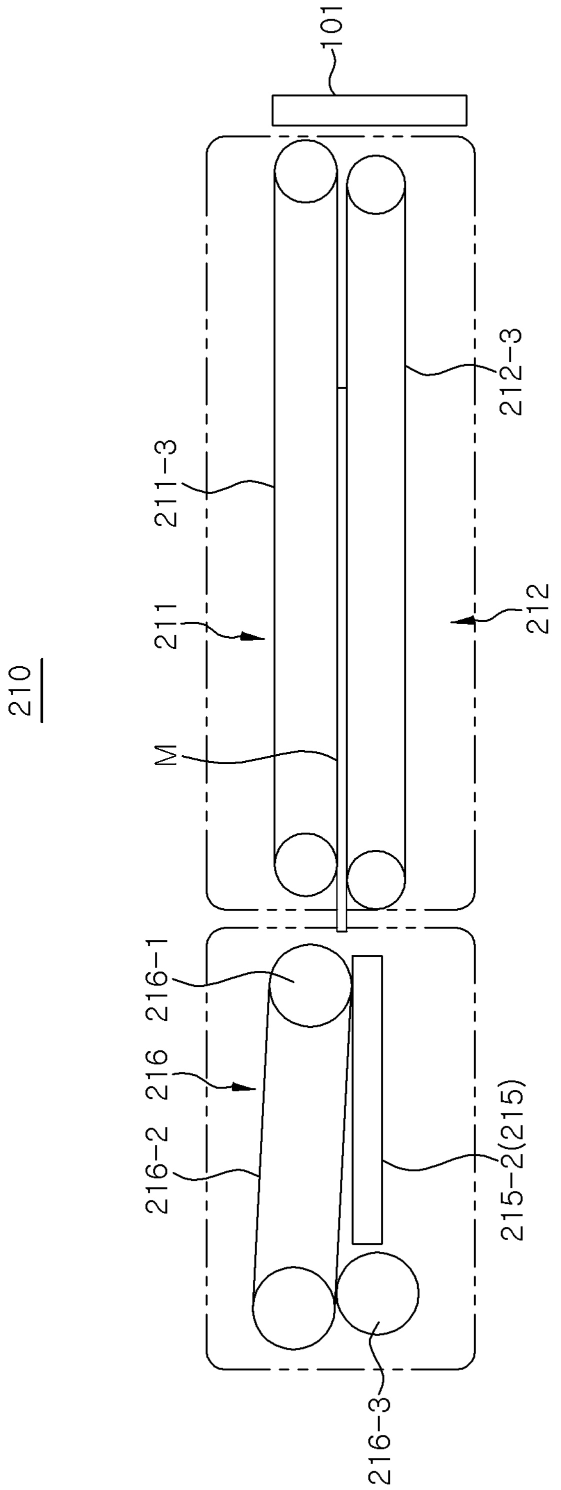
FIG. 5 is a diagram showing the operating state of the automated teller machine when the medium is completely input, according to one embodiment of the present disclosure.
Figure 6:
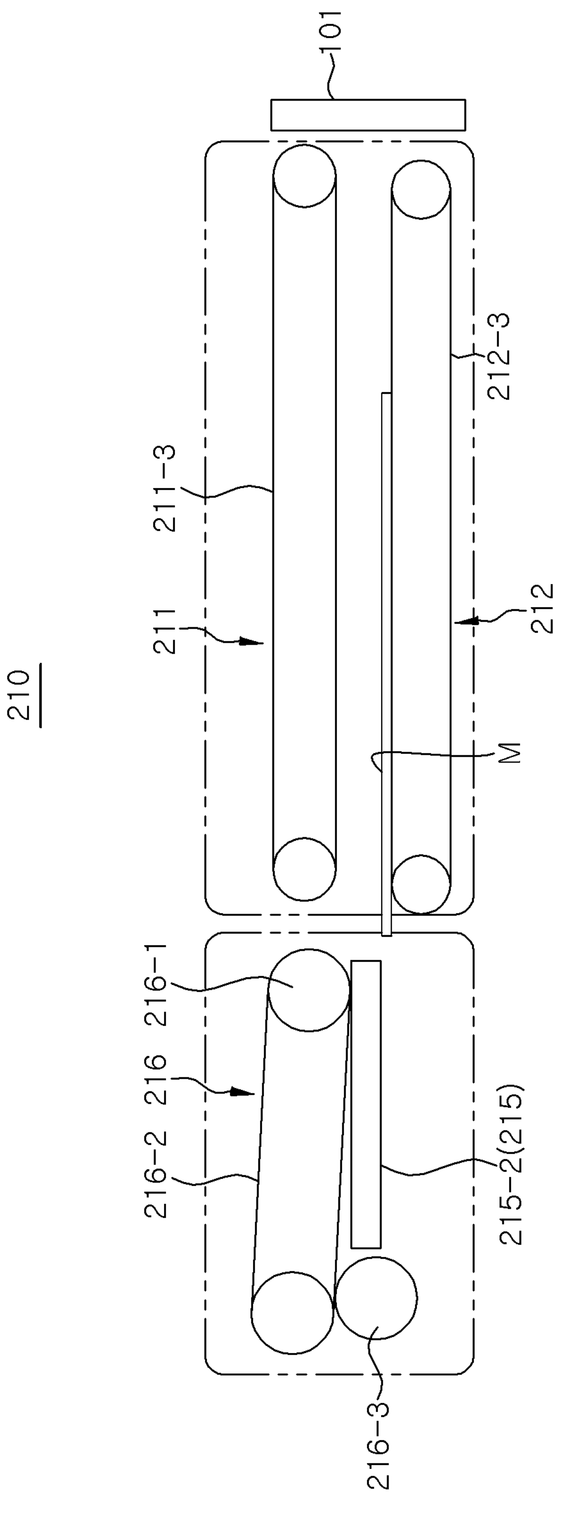
FIG. 6 is a diagram showing the operating state of the automated teller machine when the medium is aligned in the bundle receiving unit before depositing, according to one embodiment of the present disclosure.
Figure 7:
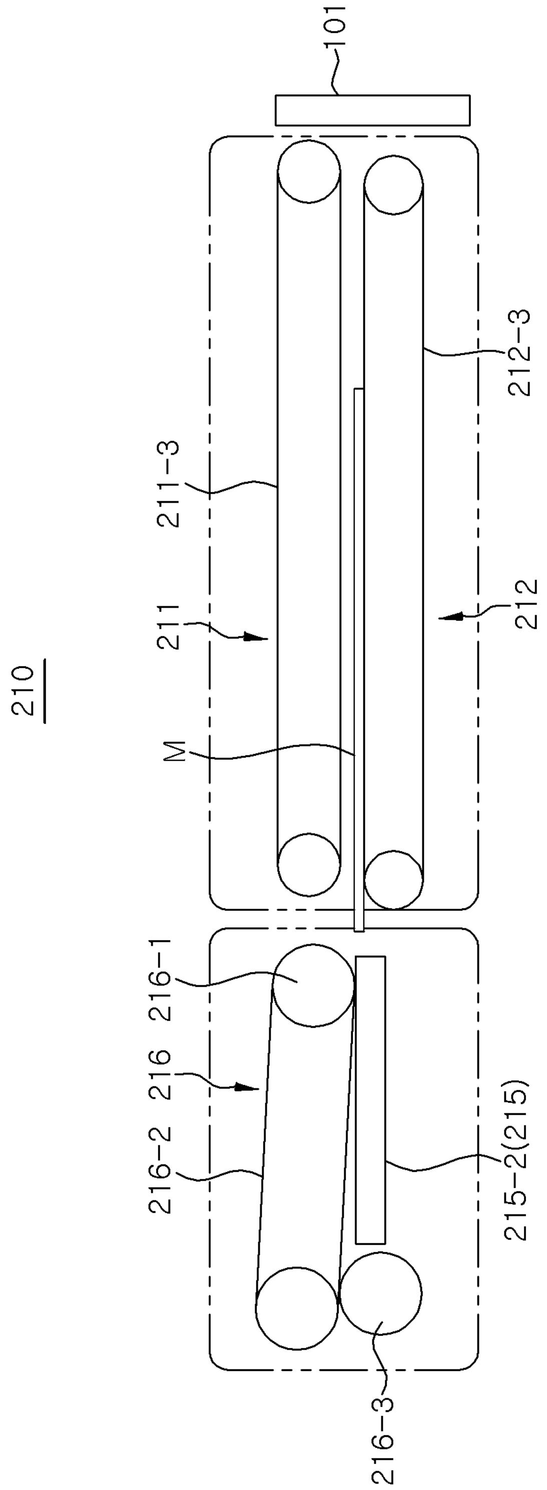
FIG. 7 is a diagram showing the operating state of the automated teller machine when the medium is prepared to be conveyed to a semi-separation unit, according to one embodiment of the present disclosure.
Figure 8:
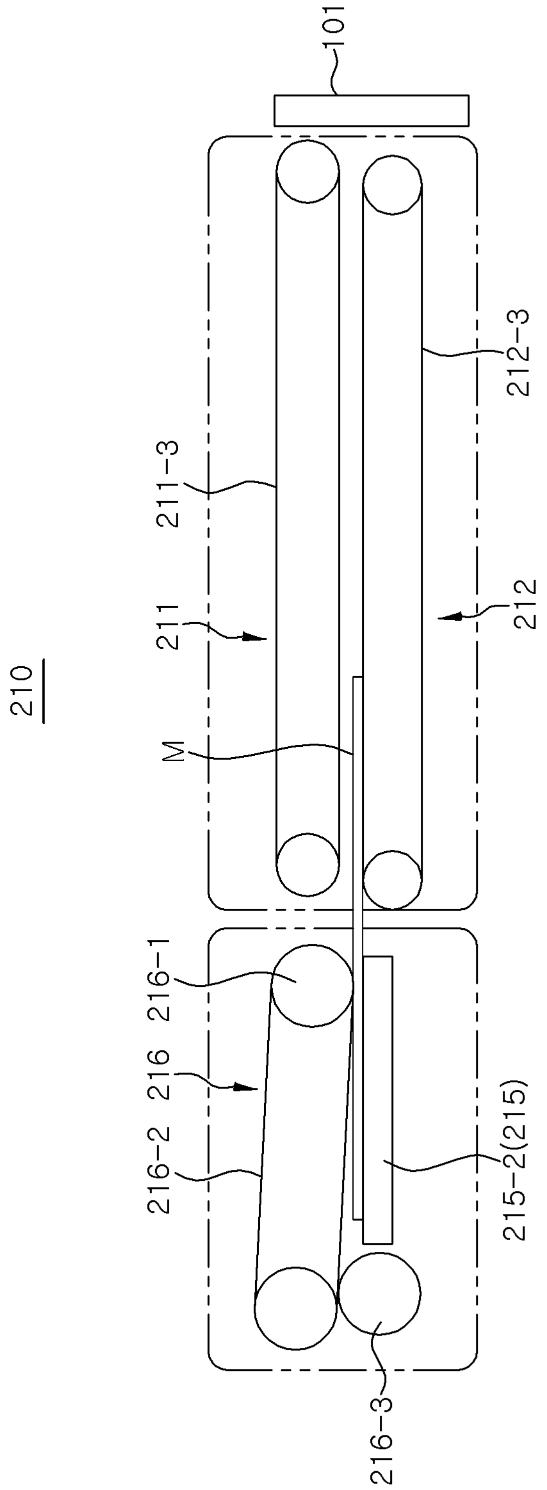
FIG. 8 is a diagram showing the operating state of the automated teller machine when the medium is conveyed to the semi-separation unit, according to one embodiment of the present disclosure.

For example, referring to FIG. 5, the mediums M may be conveyed to be close to the semi-separation unit 215 through the first bundle transport unit 211 and the second bundle transport unit 212 of the bundle receiving unit 210. Referring to FIG. 6, when the mediums M are positioned close to the semi-separation unit 215, the mediums M may be aligned in the bundle receiving unit 210 before being deposited through the semi-separation unit 215. In order to align the mediums M, in a state in which the second bundle transport unit 212 is lowered, the second bundle transport unit 212 may convey the mediums M in the depositing direction aligns the ends of the mediums M with respect to the semi-separation unit 215. Referring to FIG. 7, when the mediums M are aligned in the bundle receiving unit 210, the second bundle transport unit 212 may be moved up to convey the mediums M to the semi-separation unit 215. Referring to FIG. 8, when the mediums M are positioned at a height at which the mediums M can be conveyed toward the semi-separation unit 215, the mediums M can be conveyed to the semi-separation unit 215.

Figure 9:
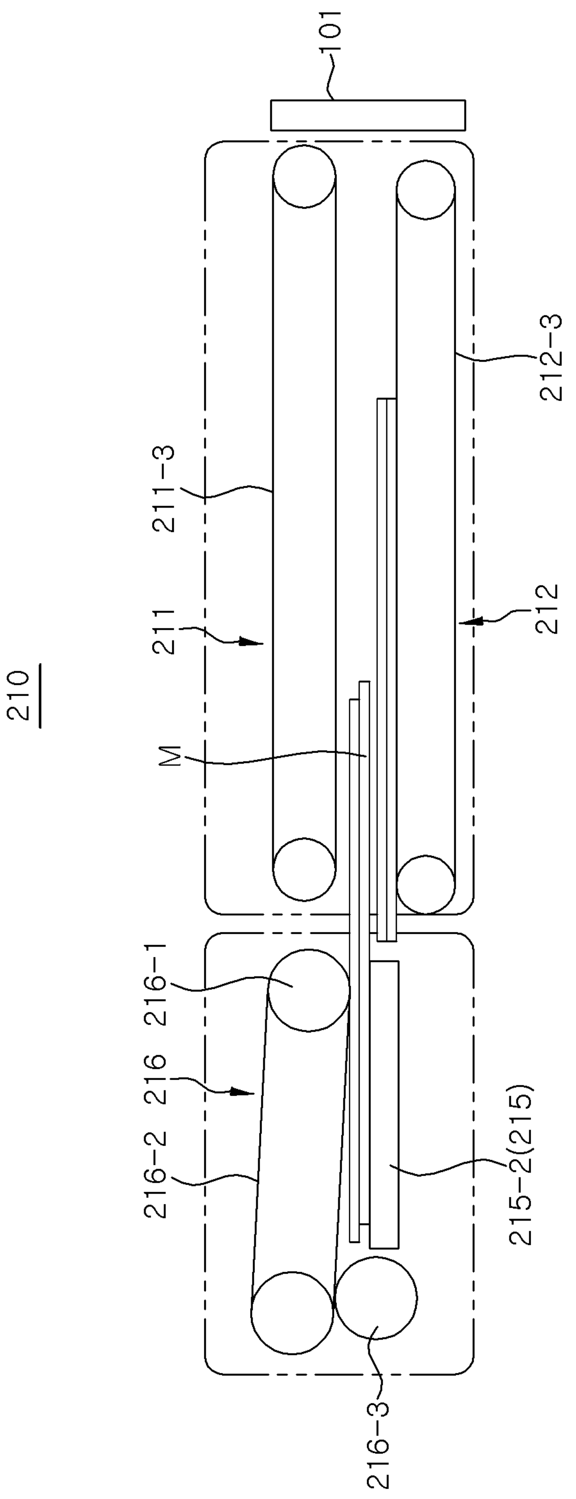
FIG. 9 is a diagram showing the operating state of the automated teller machine when the mediums are prepared to be separated individual sheets in the semi-separation unit, according to one embodiment of the present disclosure.
Figure 10:
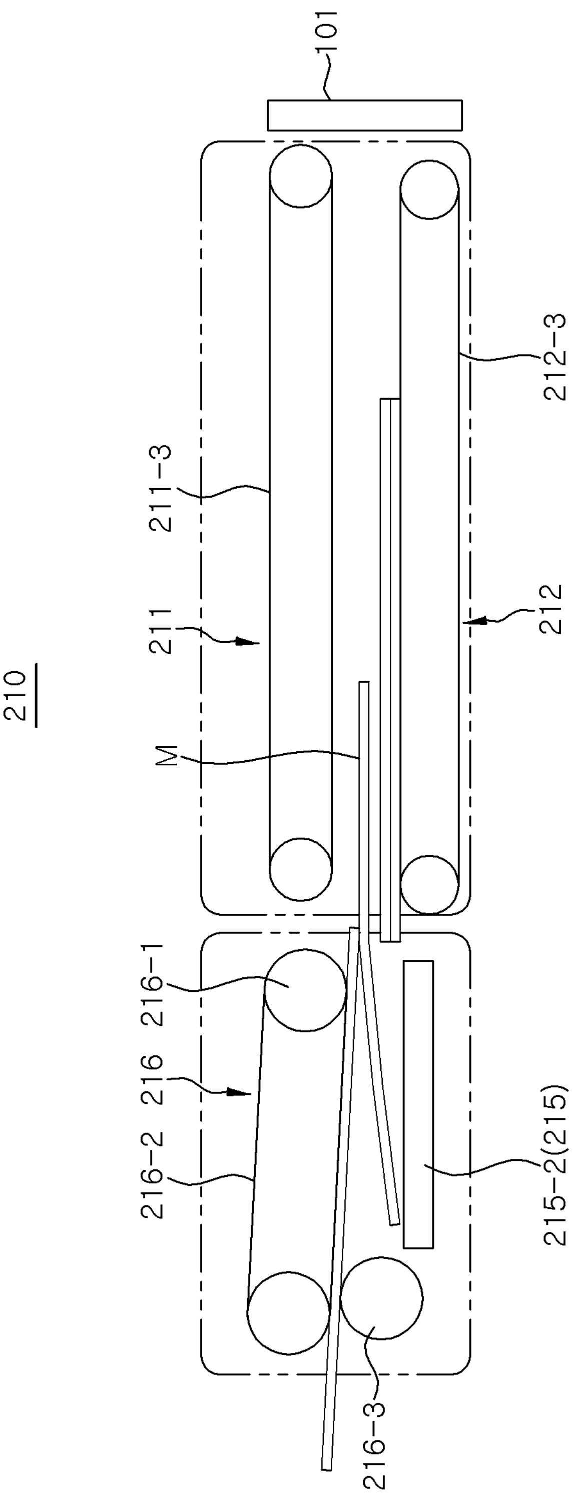
FIG. 10 is a diagram showing the operating state of the automated teller machine when the mediums is normally separated through the sheet separation unit, according to one embodiment of the present disclosure.
Figure 11:
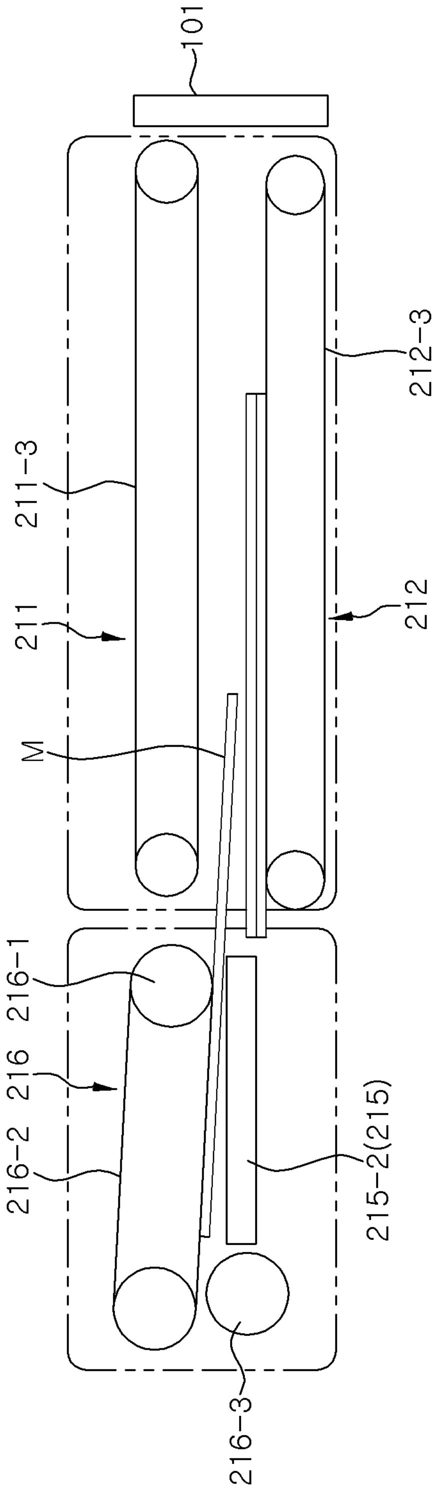
FIG. 11 is a diagram showing the operating state of the automated teller machine when the medium is later separated from the semi-separation unit, according to one embodiment of the present disclosure.

Referring to FIGS. 9 and 10, when the mediums M are prepared for sheet separation in the semi-separation unit 215, the semi-separation unit 215 may be lowered. Referring to FIG. 11, as the mediums M are successively separated into sheets in the sheet separation unit 215, the semi-separation unit 215 may be moved up.

Figure 12:
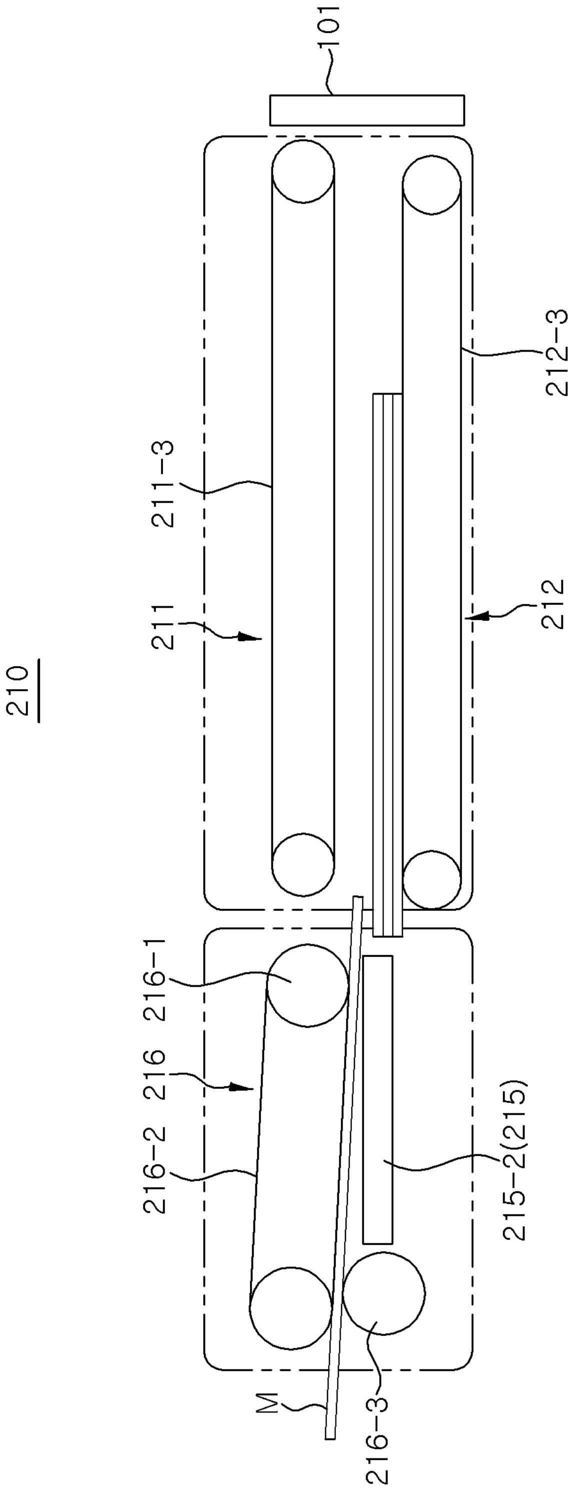
FIG. 12 is a diagram showing the operating state of the automated teller machine when the mediums are prepared to be discharged from the bundle receiving unit, according to one embodiment of the present disclosure.
Figure 13:
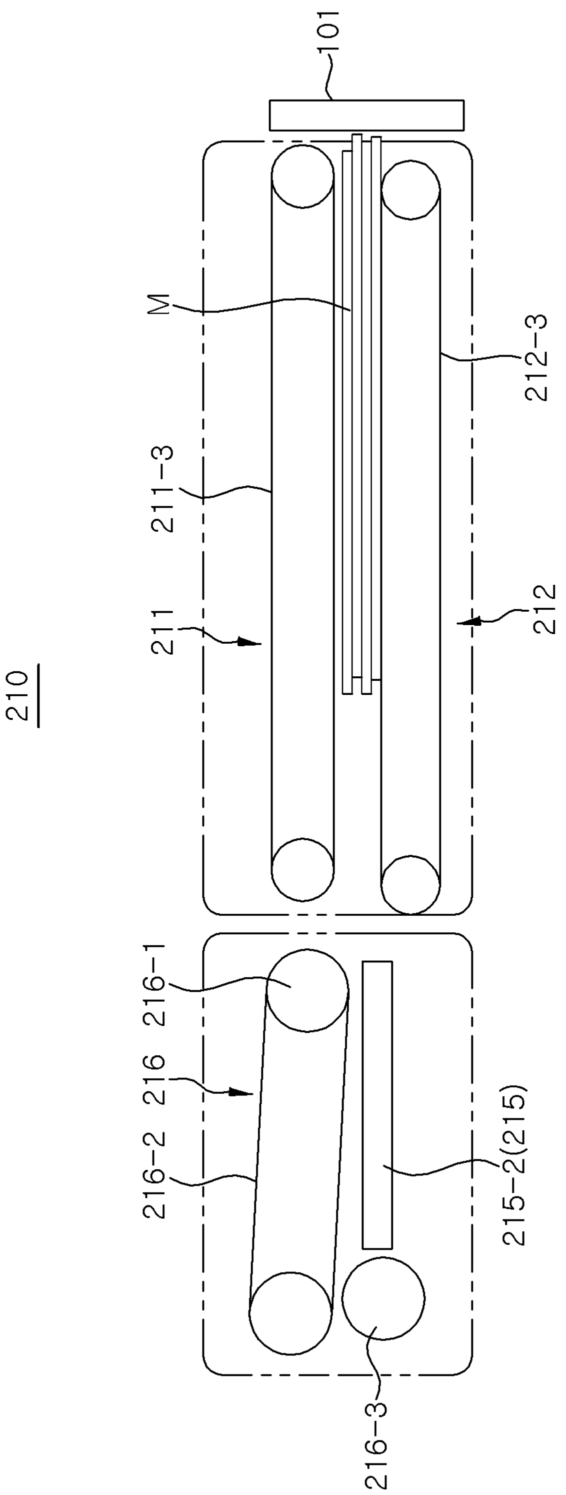
FIG. 13 is a diagram showing the operating state of the automated teller machine when mediums are aligned in the bundle receiving unit before discharge, according to one embodiment of the present disclosure.
Figure 14:
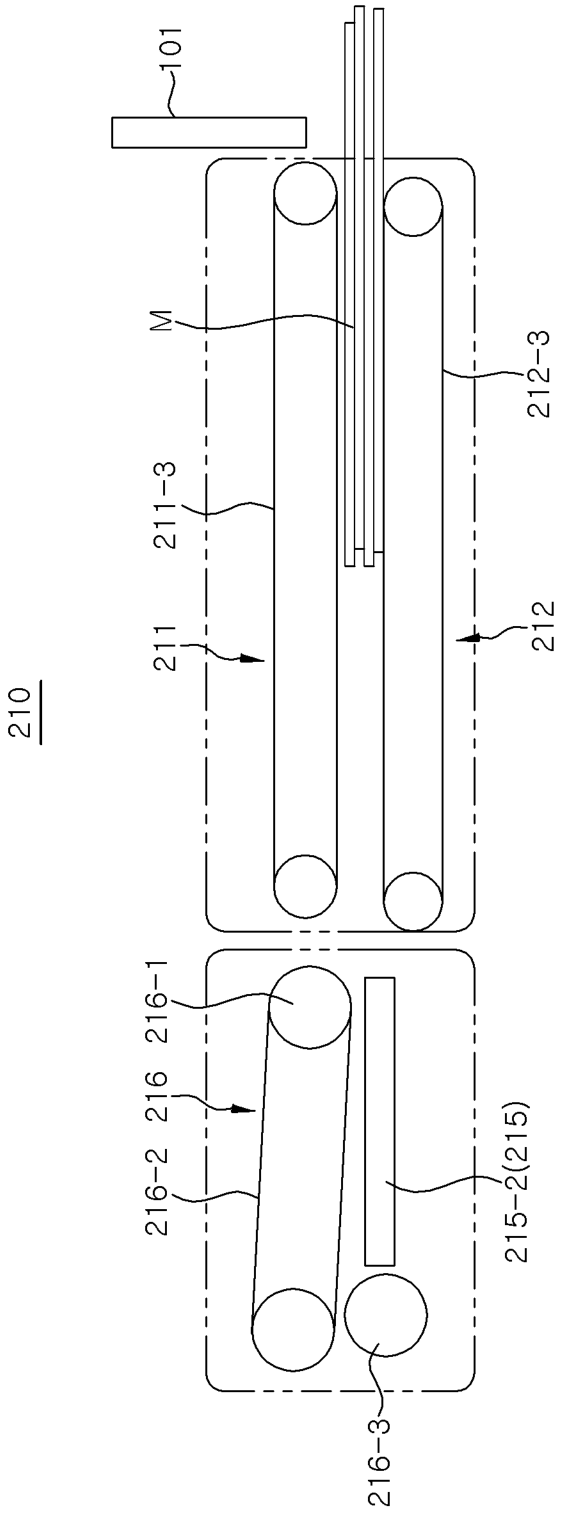
FIG. 14 is a diagram showing the operating state of the automated teller machine when the medium are discharged from the bundle receiving unit, according one embodiment of the present disclosure.

In addition, in the medium conveyance step S200, the mediums M may be discharged through the bundle receiving unit 210. Referring to FIG. 12, when the mediums M are discharged through the bundle receiving unit 210, the mediums M on the conveyance path may be conveyed to the semi-separation unit 215 through the sheet separation unit 216. The mediums M conveyed to the semi-separation unit 215 may be stacked in the stacking space SR of the bundle receiving unit 210 in the form of a bundle. The mediums M stacked in the form of a bundle may be conveyed in a withdrawal direction toward the shutter 101 by the first bundle transport unit 211 and the second bundle transport unit 212. Referring to FIG. 13, the mediums M may be aligned in the bundle receiving unit 210 before being discharged from the bundle receiving unit 210. In order to align the mediums M in the bundle receiving unit 210, the second bundle transport unit 212 may convey the mediums M in the withdrawal direction to align the ends of the mediums M with respect to the shutter 101. Referring to FIG. 14, after the mediums M are aligned in the bundle receiving unit 210, when the shutter 101 is opened, the mediums M can be discharged to the outside by the first bundle transport unit 211 and the second bundle transport unit 212.

Figure 15:
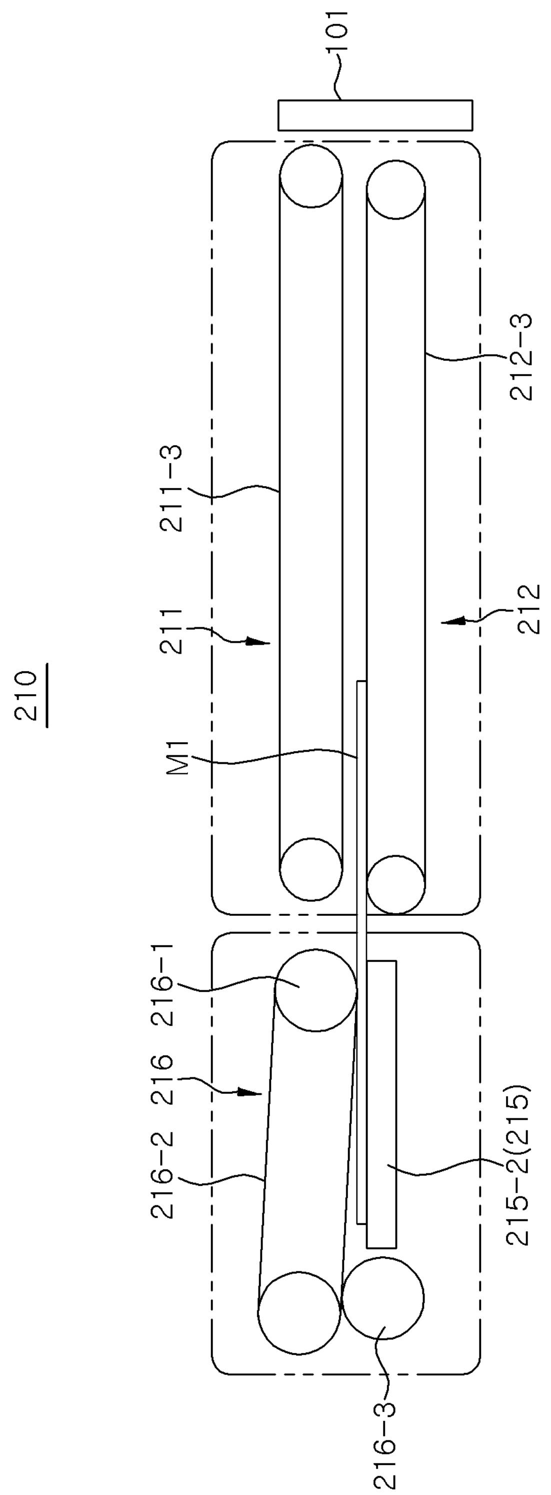
FIG. 15 is a diagram illustrating the operating state of the automated teller machine when the first medium is laid across the semi-separation unit and a second bundle transport unit for rejection of the mediums, according to one embodiment of the present disclosure.
Figure 16:
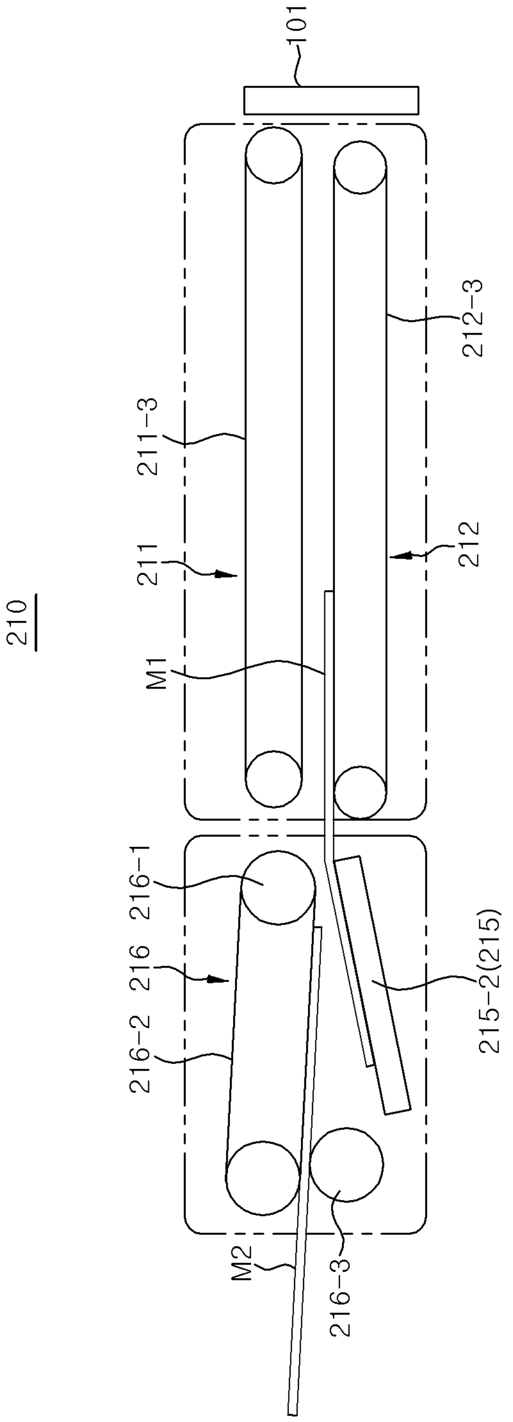
FIG. 16 is a diagram showing the operating state of the automated teller machine when the semi-separation unit is rotated at an inclined angle in a state in which the first medium is laid across the semi-separation unit and a second bundle transport unit for rejection of the mediums, according to one embodiment of the present disclosure.
Figure 17:
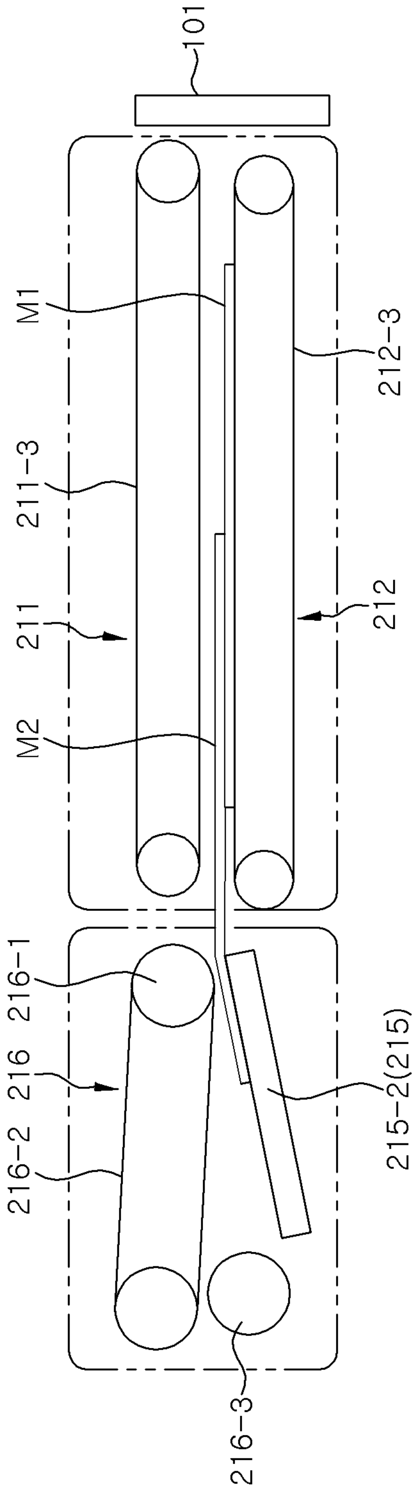
FIG. 17 is a diagram illustrating an operating state of an automated teller machine when the second medium is laid across the semi-separation unit and a second bundle transport unit for rejection of the mediums, according to one embodiment of the present disclosure.
Figure 18:
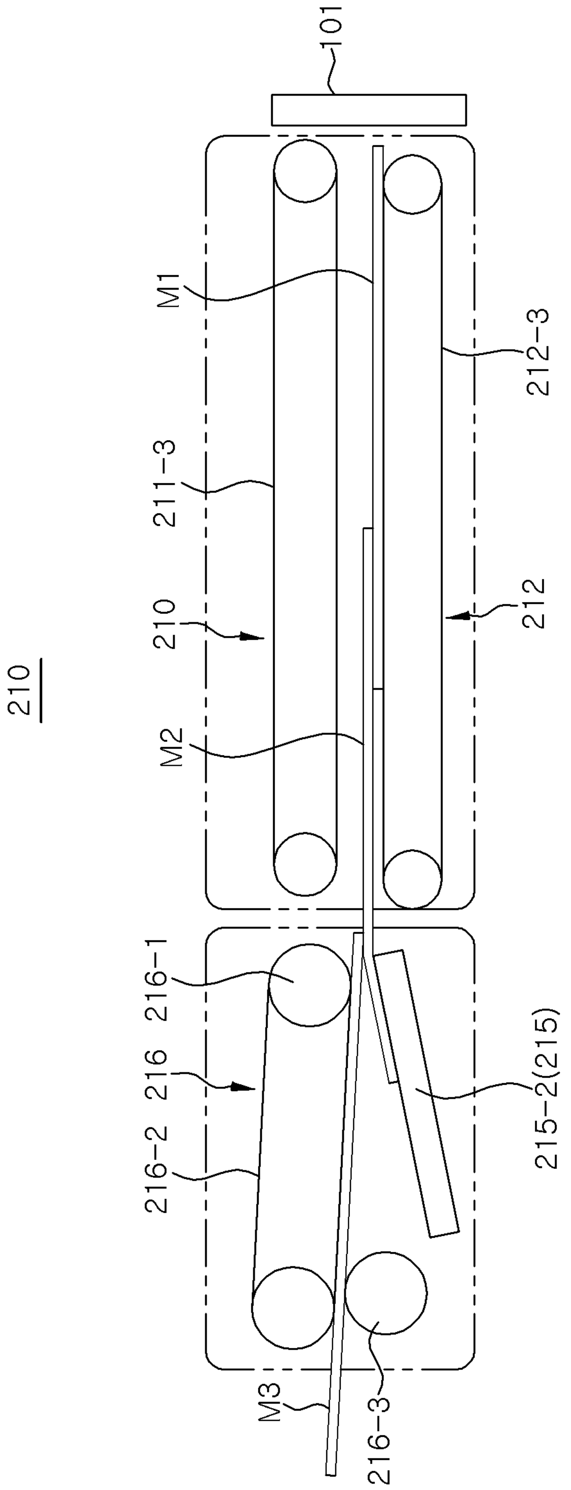
FIG. 18 is a diagram showing the operating state of the automated teller machine when the third medium is discharged to the semi-separation unit in a state in which the second medium is laid across the semi-separation unit and a second bundle transport unit for rejection of the mediums, according to one embodiment of the present disclosure.

Further, in the medium conveyance step S200, mediums as reject banknotes may be discharged through the bundle receiving unit 210. Referring to FIG. 15, in order to discharge the mediums as reject banknotes, the first medium M1 to be discharged may be conveyed to the semi-separation unit 215. In this case, the first medium M1 may be laid across the semi-separation unit 215 and the second bundle transport unit 212. Referring to FIG. 16, while the first medium M1 is laid across the semi-separation unit 215 and the second bundle transport unit 212, the semi-separation unit 215 may be rotated to be inclined upward toward the stacking space SR. When the semi-separation unit 215 is rotated to be inclined, the second medium M2 may be conveyed to be laid across the semi-separation unit 215 and the second bundle transport unit 212. Referring to FIG. 17, when the second medium M2 is laid across the semi-separation unit 215 and the second bundle transport unit 212, the first medium M1 and the second medium M2 may be conveyed in the withdrawal direction by the first bundle transport unit 211 and the second bundle transport unit 212. Then, referring to FIG. 18, the third medium M3 may be conveyed to be laid across the semi-separation unit 215 and the second bundle transport unit 212 to overlap the second medium M2. When the third medium M3 is placed on the second medium M2 laid across the semi-separation unit 215 and the second bundle transport unit 212, in the same manner as described above, the second medium M2 and the third medium M3 may be conveyed in the withdrawal direction by the first bundle transport unit 211 and the second bundle transport unit 212.

In the medium return step S300, when a failure occurs during the conveyance of the medium, the medium being conveyed through the conveyance path may be returned to the bundle receiving unit 210. In the medium return step S300, the medium may be returned to the bundle receiving unit 210 so that the mediums on the conveyance path are stacked in a single bundle with the mediums stacked in the stacking space SR.

Figure 19:
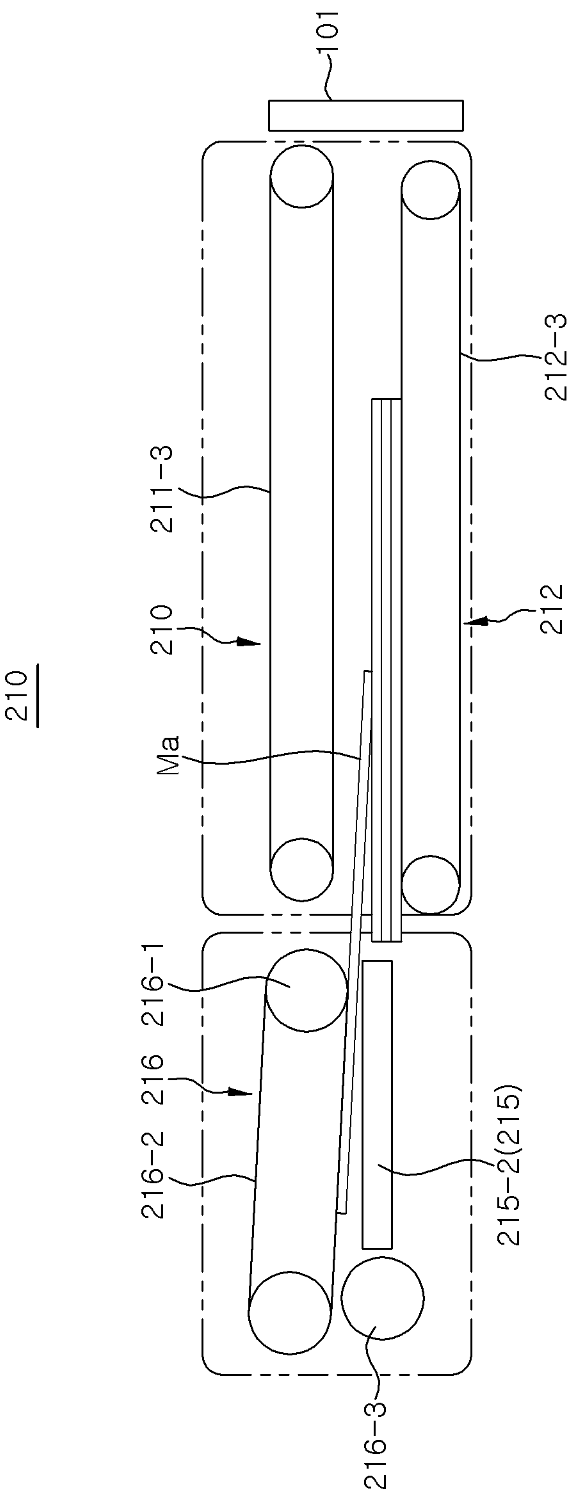
FIG. 19 is a diagram showing the operating state of the automated teller machine when the uppermost medium among the mediums initially deposited and stacked in the bundle receiving unit is conveyed to the semi-separation unit, according to one embodiment of the present disclosure.

For example, referring to FIG. 19, when the first deposited mediums are stacked in the stacking space SR of the bundle receiving unit 210, an uppermost medium Ma located at the top among the mediums stacked in the stacking space SR is moved in the depositing direction to be laid on the bill press 215-2 of the bundle receiving unit 210.

Figure 20:
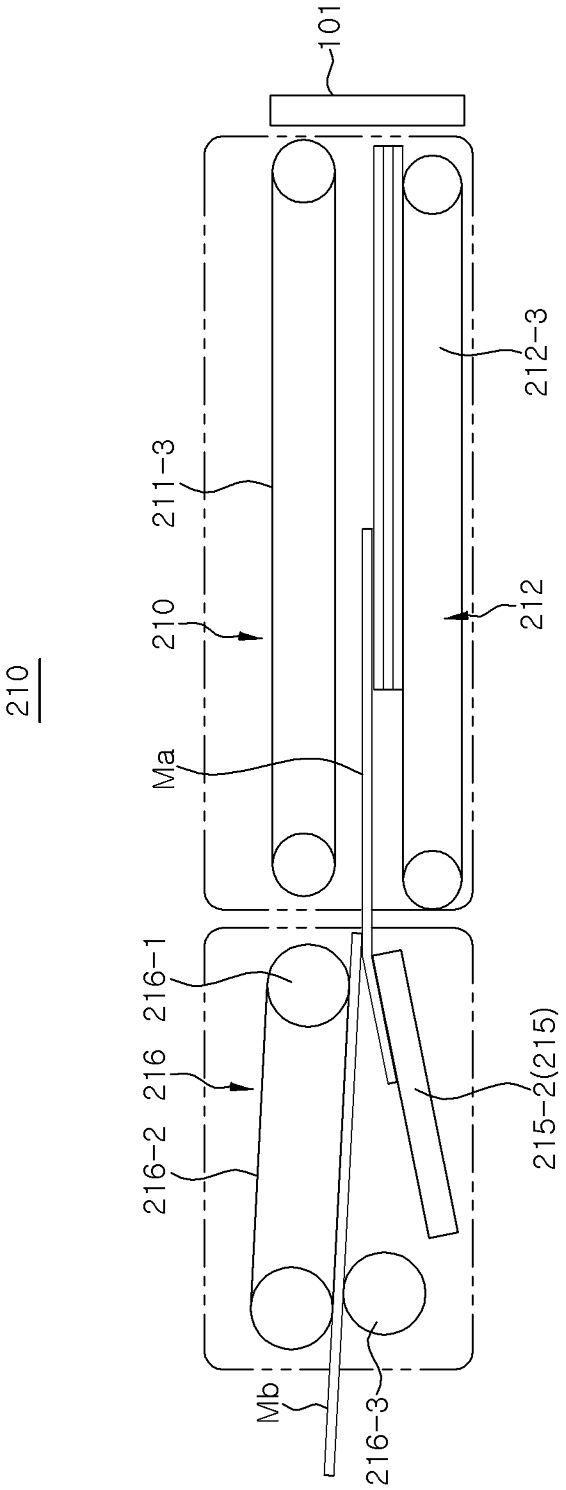
FIG. 20 is a diagram showing the operating state of the automated teller machine when a medium conveyed through the conveyance path is laid on the uppermost medium conveyed to the semi-separation unit, according to one embodiment of the present disclosure.

Referring to FIG. 20, when the uppermost medium Ma is laid on the bill press 215-2 of the bundle receiving unit 210, the bill press 215-2 of the semi-separation unit 215 may be disposed to be inclined upward toward the stacking space SR, and a medium Mb on the conveyance path may be conveyed to overlap the uppermost medium Ma laid on the bill press 215-2 of the semi-separation unit 215. When the medium Mb on the conveyance path overlaps the uppermost medium Ma, the medium Mb on the conveyance path can be aligned in a bundle by conveying the uppermost medium Ma in the withdrawal direction by the first bundle transport unit 211 and the second bundle transport unit 212. In the same manner as described above, the mediums being conveyed through the conveyance path can be continuously returned to the bundle receiving unit 210.

The invention claimed is:

1. An automated teller machine comprising:

a bundle receiving unit in which a bundle of mediums are input;

a discrimination unit that receives the mediums from the bundle receiving unit and discriminates the mediums;

a temporary holding unit that temporarily holds the mediums discriminated in the discrimination unit;

a conveyance path for conveying the mediums between the discrimination unit and the temporary holding unit; and a controller that controls the bundle receiving unit, the discrimination unit, and the temporary holding unit, wherein when the mediums on the conveyance path are returned to the bundle receiving unit, the controller controls the bundle receiving unit such that the mediums on the conveyance path are stacked in a single bundle with the mediums stacked in the bundle receiving unit, and controls so that an uppermost medium located at the top among the mediums stacked in the stacking space is moved in a direction opposite to a deposit direction to be laid on a bill press of the bundle receiving unit.

2. An automated teller machine comprising:

a bundle receiving unit in which a bundle of mediums are input;

a discrimination unit that receives the mediums from the bundle receiving unit and discriminates the mediums;

a temporary holding unit that temporarily holds the mediums discriminated in the discrimination unit;

a conveyance path for conveying the mediums between the discrimination unit and the temporary holding unit; and a controller that controls the bundle receiving unit, the discrimination unit, and the temporary holding unit, wherein when the mediums on the conveyance path are returned to the bundle receiving unit, the controller controls the bundle receiving unit such that the mediums on the conveyance path are stacked in a single bundle with the mediums stacked in the bundle receiving unit, wherein the bundle receiving unit includes:

a bundle transport unit including a first bundle transport unit and a second bundle transport unit that are spaced apart from each other to face each other to provide a stacking space in which the bundle of mediums are conveyed;

a semi-separation unit that allows a preset number of mediums to pass therethrough from the bundle receiving unit; and a sheet separation unit that separates the mediums that have passed through the semi-separation unit into individual sheets, wherein the semi-separation unit includes:

a semi-separating roller providing a gap, between the semi-separating roller and a lower surface of the sheet separation unit, for allowing a preset number of mediums to pass therethrough; and a bill press, on which the semi-separating roller is disposed, selectively movable up and down and rotatable in an inclined state, and wherein when the mediums on the conveyance path are returned to the stacking space, the controller controls the bill press to be inclined upward toward the stacking space.

3. The automated teller machine of claim 2, wherein the first bundle transport unit includes:

a first bundle transport frame;

first bundle transport rollers disposed at both ends of the first bundle transport frame to be spaced apart from each other and rotatable in a forward direction or a reverse direction; and a first bundle transport belt rotatable by the first bundle transport rollers to transport the mediums in a deposit direction or a direction opposite to the deposit direction, and wherein the controller controls the first bundle transport rollers to move the mediums in the direction opposite to the deposit direction so that an uppermost medium located at the top among the stacked mediums is laid on the bill press.

4. A control method of an automated teller machine, comprising:

a medium input step of inputting a bundle of mediums in a stacking space of a bundle receiving unit;

a medium conveyance step of conveying the mediums input in the bundle receiving unit through a conveyance path; and a media return step of returning the mediums being conveyed through the conveyance path to the bundle receiving unit when a failure occurs during the conveyance of the mediums, wherein in the media return step, the mediums are returned to the bundle receiving unit so that the mediums on the conveyance path are stacked in a bundle with the mediums stacked in the stacking space, wherein in the medium return step, an uppermost medium located at the top among the mediums stacked in the stacking space is moved in a direction opposite to a deposit direction to be laid on a bill press of the bundle receiving unit.

5. The control method of claim 4, wherein in the medium return step, the bill press is disposed to be inclined upward toward the stacking space, and a medium on the conveyance path is conveyed to overlap the medium laid on the bill press.

* * * * *